US010804949B2

(12) United States Patent
Wilder et al.

(10) Patent No.: US 10,804,949 B2
(45) Date of Patent: *Oct. 13, 2020

(54) WATER RESISTANT WIRELESS DEVICE SPEAKER CASE AND CONFERENCE CALL MODULE

(71) Applicant: VIBES AUDIO LLC, Irvine, CA (US)

(72) Inventors: Shane Wilder, Aliso Viejo, CA (US); Scharles Wilder, San Diego, CA (US)

(73) Assignee: VIBES AUDIO LLC, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/277,702

(22) Filed: Feb. 15, 2019

(65) Prior Publication Data
US 2019/0288725 A1 Sep. 19, 2019

Related U.S. Application Data

(63) Continuation of application No. 15/868,829, filed on Jan. 11, 2018, now Pat. No. 10,211,876, which is a (Continued)

(51) Int. Cl.
H04M 3/42 (2006.01)
H04B 1/3888 (2015.01)
(Continued)

(52) U.S. Cl.
CPC ............ *H04B 1/3888* (2013.01); *H04M 1/02* (2013.01); *H04M 1/0254* (2013.01);
(Continued)

(58) Field of Classification Search
None
See application file for complete search history.

(56) References Cited

U.S. PATENT DOCUMENTS

| 5,245,669 A | 9/1993 | Bittencourt |
| D344,261 S | 2/1994 | Watanabe |

(Continued)

FOREIGN PATENT DOCUMENTS

| CN | 1949672 A | 4/2007 |
| CN | 103843311 A | 6/2014 |

(Continued)

OTHER PUBLICATIONS

U.S. Appl. No. 29/609,364, filed Jun. 29, 2017, Wilder et al.
(Continued)

*Primary Examiner* — Idowu O Osifade
(74) *Attorney, Agent, or Firm* — Knobbe, Martens, Olson & Bear, LLP

(57) ABSTRACT

A speaker and conference call module and mobile device case combination allows a mobile device, such as a smartphone, to be retained by the mobile device case. The speaker and conference call module is configured to wirelessly connect to the mobile device to permit audio from the mobile device to be played thereupon. The speaker and conference call module further includes a microphone to permit audio pick-up by the module and deliver that audio signal to the mobile device, permitting two-way conference call features. The speaker and conference call module can produce sound via one or more exciter voice coils internally attached to the front surface thereof, where the front surface may be a material suitable for sound generation via an exciter, such as a carbon fiber material. The speaker and conference call module can be removed from and reattached to the mobile device case for convenient portability.

20 Claims, 7 Drawing Sheets

Related U.S. Application Data continuation of application No. 15/287,211, filed on Oct. 6, 2016, now Pat. No. 9,887,725.

(51) Int. Cl.
  *H04M 1/02* (2006.01)
  *H04M 1/60* (2006.01)
  *H04M 1/725* (2006.01)
  *H04M 3/56* (2006.01)
  *H04B 1/38* (2015.01)

(52) U.S. Cl.
  CPC ....... *H04M 1/6041* (2013.01); *H04M 1/7253* (2013.01); *H04M 3/56* (2013.01); *H04B 2001/3894* (2013.01); *H04M 2250/02* (2013.01); *H04M 2250/62* (2013.01)

(56) References Cited

U.S. PATENT DOCUMENTS

| | | |
|---|---|---|
| 6,675,931 B2 | 1/2004 | Sahyoun |
| D542,287 S | 5/2007 | Chung et al. |
| 7,457,407 B2 | 11/2008 | Sun et al. |
| D586,787 S | 2/2009 | Rivard et al. |
| D596,158 S | 7/2009 | Ragde, Jr. et al. |
| D596,618 S | 7/2009 | Zha |
| 7,639,830 B2 | 12/2009 | Schell et al. |
| 7,653,209 B2 | 1/2010 | Abe et al. |
| D624,304 S | 9/2010 | Danze et al. |
| D635,555 S | 4/2011 | Giles |
| D639,731 S | 6/2011 | Sun |
| 7,985,501 B2 | 7/2011 | Kim et al. |
| D644,428 S | 9/2011 | Feng |
| D654,931 S | 2/2012 | Lemelman et al. |
| 8,251,210 B2 | 8/2012 | Schmidt et al. |
| D669,459 S | 10/2012 | Kim |
| D674,803 S | 1/2013 | Westrup |
| 8,435,656 B2 | 5/2013 | Koh et al. |
| D685,728 S | 7/2013 | Hoshi et al. |
| D685,738 S | 7/2013 | Moore et al. |
| 8,485,404 B2 | 7/2013 | Monaco et al. |
| D688,654 S | 8/2013 | Stevinson |
| 8,616,422 B2 | 12/2013 | Adelman et al. |
| D703,651 S | 4/2014 | Ehrlich |
| D704,194 S | 5/2014 | Young |
| 8,833,379 B1 | 9/2014 | Kaplan |
| D719,950 S | 12/2014 | Smith et al. |
| D723,533 S | 3/2015 | Stevinson |
| D724,785 S | 3/2015 | Frederick |
| D725,093 S | 3/2015 | Sun et al. |
| D725,643 S | 3/2015 | Lee et al. |
| D726,144 S | 4/2015 | Kang |
| D726,701 S | 4/2015 | Stevinson |
| D735,184 S | 7/2015 | Lee et al. |
| D735,706 S | 8/2015 | Stevinson |
| D744,470 S | 12/2015 | Stevinson |
| D746,801 S | 1/2016 | Pan |
| 9,236,617 B2 | 1/2016 | Ogami et al. |
| D756,967 S | 5/2016 | Manz |
| D759,004 S | 6/2016 | Stevinson |
| D765,069 S | 8/2016 | Jeffrey |
| D769,854 S | 10/2016 | Duval et al. |
| 9,467,189 B2 | 10/2016 | Day et al. |
| 9,525,946 B2 | 12/2016 | Bank |
| D775,618 S | 1/2017 | Kim et al. |
| 9,653,724 B2 | 5/2017 | Lim |
| D789,343 S | 6/2017 | Hawes et al. |
| D791,115 S | 7/2017 | Schilling |
| 9,887,725 B1 | 2/2018 | Wilder et al. |
| 9,903,686 B2 | 2/2018 | Maynard |
| D819,620 S | 6/2018 | Parker |
| 10,027,788 B2 | 7/2018 | Pierce |
| D835,087 S | 12/2018 | Wilder et al. |
| D836,620 S | 12/2018 | Ehrlich |
| D837,776 S | 1/2019 | Chung |
| D841,636 S | 2/2019 | Turk |
| 10,211,876 B2 | 2/2019 | Wilder et al. |
| D848,366 S | 5/2019 | Lian |
| D857,687 S | 8/2019 | Frederick |
| D865,741 S | 11/2019 | Hawes et al. |
| D868,051 S | 11/2019 | Kim et al. |
| D869,453 S | 12/2019 | Wilder et al. |
| D884,691 S | 5/2020 | Wilder et al. |
| 2004/0092172 A1 | 5/2004 | Munger, Jr. et al. |
| 2005/0168111 A1 | 8/2005 | Bank et al. |
| 2007/0087263 A1 | 4/2007 | Ge et al. |
| 2012/0206303 A1 | 8/2012 | Desclos et al. |
| 2013/0157730 A1 | 6/2013 | McCormac et al. |
| 2013/0181584 A1 | 7/2013 | Whitten et al. |
| 2013/0334070 A1 | 12/2013 | Adelman et al. |
| 2014/0135080 A1 | 5/2014 | Kimball et al. |
| 2014/0290917 A1 | 10/2014 | Chang et al. |
| 2015/0327812 A1 | 11/2015 | Poplaw |
| 2015/0341712 A1 | 11/2015 | Wilcox et al. |
| 2016/0118016 A1 | 4/2016 | DiPrizio |
| 2019/0045041 A1 | 2/2019 | Pierce |
| 2020/0059545 A1 | 2/2020 | Wilder et al. |

FOREIGN PATENT DOCUMENTS

| | | |
|---|---|---|
| CN | 104053328 A | 9/2014 |
| CN | 107211053 A | 9/2017 |
| JP | 5483407 B2 | 5/2014 |
| KR | 3006336210000 | 2/2012 |
| KR | 3008836580000 | 12/2016 |
| KR | 3008854610000 | 12/2016 |
| KR | 3009120470000 | 6/2017 |
| WO | WO 2016/069652 A1 | 5/2016 |

OTHER PUBLICATIONS

U.S. Appl. No. 29/671,962, filed Nov. 30, 2018, Wilder et al.
U.S. Appl. No. 16/340,078, filed Apr. 5, 2019, Wilder et al.
International Search Report and Written Opinion of the International Searching Authority for International Application No. PCT/US2017/055118, dated Feb. 13, 2018, in 14 pages.
Roxon Modular Smartphone System, Vibes Modular, downloaded from https://vibesmodular.com/ on Apr. 30, 2018, in 6 pages.
Vibes Audio Vibrox review, posted at Digitaltrends.com, posting date Dec. 12, 2017, [online], [site visited Dec. 15, 2017]. Available from Internet, <URL: https ://www.digitaltrends.com/music/vibes-audio-vibrox-review/>.
Review: Viberox Sound Engine, publication date Feb. 13, 2018, [online][site visited Dec. 18, 2019] URL: https://www.prosoundnetwork.com/archives/review-viberox-sound-engine (Year: 2018).
Vibes Audio Modular Smartphone Accessories Featuring Baserox, Vibrox, an Voltrox, publication date Jan. 2, 2018, [online][site visited Dec. 18, 2019] URL: https://gstylemag.com/2018/01/02/vibes-aud io-modular-smartphone-accessories-featuri ng-baserox-vi brox-and-voltrox/ (Year: 2018).

WATER RESISTANT WIRELESS DEVICE SPEAKER CASE AND CONFERENCE CALL MODULE

INCORPORATION BY REFERENCE TO ANY PRIORITY APPLICATIONS

Any and all applications for which a foreign or domestic priority claim is identified in the Application Data Sheet as filed with the present application are incorporated by reference under 37 CFR 1.57 and made a part of this specification.

BACKGROUND OF THE INVENTION

1. Field of the Invention

One or more embodiments of the invention relates generally to wireless device accessories. More particularly, the invention relates to a water resistant wireless device speaker case and conference call module that supports a wireless device, such as a mobile phone, and includes a detachable wireless speaker or conference call module.

2. Description of Prior Art and Related Information

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Cellular phone technology has advanced tremendously in recent years. Unfortunately, the audio technology embedded in these devices has remained stagnant as these devices shrink in size.

To address this issue, many manufacturers have designed wired and wireless speakers for use with mobile devices, such as cellular phones, including smartphones. These speakers are generally large, separate devices that perform similar to conventional audio speakers connected to an audio source. These audio devices are not readily portable with the mobile device, as both the speaker and the mobile device are separate devices that, if linked at all, are only interconnected by a removable wired connection.

Moreover, these typical wired and wireless speakers are one-way in that they provide audio output from the mobile device, but do not permit two-way communication, such as what is needed for a speaker phone/conference call.

To address this need, several manufacturers offer hands-free calling modules that can connect via a wireless signal, such as Bluetooth®, to a mobile device. These devices allow users to conduct phone calls without having to hold the phone to one's ear and speak into the phone itself. However, like the wired and wireless speakers described above, these devices are typically not carried with the mobile device. Thus, the user is required to carry both their mobile device in addition to the hands-free calling module.

In view of the foregoing, there is a need for conference call module that can produce excellent sound quality, can wirelessly connect to a mobile device, and can be carried easily with the mobile device, but can also be removable as a separate module therefrom.

SUMMARY OF THE INVENTION

Embodiments of the present invention provide a speaker and conference call module comprising a main housing; a front face forming a front surface of the main housing; one or more exciters attached to an internal surface of the front face; a wireless transceiver configured to receive an audio signal from an electronic device; a plurality of control buttons disposed on an exterior of the main housing; and a battery providing operating power to the conference call module.

Embodiments of the present invention further provide a combination mobile device case and speaker and conference call module comprising a speaker and conference call module comprising a main housing, a front face forming a front surface of the main housing, one or more exciters attached to an internal surface of the front face, a wireless transceiver configured to receive an audio signal from an electronic device, a plurality of control buttons disposed on an exterior of the main housing, a battery providing operating power to the conference call module, and a protruding back housing extending from a portion of a back side of the main housing; and a mobile device case comprising an opening on a back surface of the mobile device case, the opening having a periphery, the opening sized to receive the protruding back housing therein with the main housing resting adjacent the periphery when the speaker and conference call module is mounted onto the mobile device case.

Embodiments of the present invention also provide a combination mobile device case and speaker and conference call module comprising a speaker and conference call module comprising a main housing, a front face forming a front surface of the main housing, the front face formed from carbon fiber, one or more exciters attached to an internal surface of the front face, a wireless transceiver configured to receive an audio signal from an electronic device; a plurality of control buttons disposed on an exterior of the main housing, a water resistant microphone disposed on the exterior of the main housing, wherein the wireless receiver is configured to send a microphone-received audio signal to the electronic device, a battery providing operating power to the conference call module, and a protruding back housing extending from a portion of a back side of the main housing; and a mobile device case comprising an opening on a back surface of the mobile device case, the opening having a periphery, the opening sized to receive the protruding back housing therein with the main housing resting adjacent the periphery when the speaker and conference call module is mounted onto the mobile device case.

In some embodiments, the combination mobile device and speaker and conference call module further comprises a slide portion configured to slide on the protruding back housing and extend beyond at least one side edge of the protruding back housing.

In some embodiments, the combination mobile device and speaker and conference call module further comprises a button on the main housing, the button being mechanically connected to the slide portion, the button being resiliently depressible to move the slide portion to a compressed configuration, where the slide portion extends beyond the at least one side edge less than when the button is not depressed, wherein the slide portion fits under the periphery of the opening to removably retain the conference call module onto the mobile device case.

These and other features, aspects and advantages of the present invention will become better understood with reference to the following drawings, description and claims.

BRIEF DESCRIPTION OF THE DRAWINGS

Some embodiments of the present invention are illustrated as an example and are not limited by the figures of the accompanying drawings, in which like references may indicate similar elements.

Figure 1:
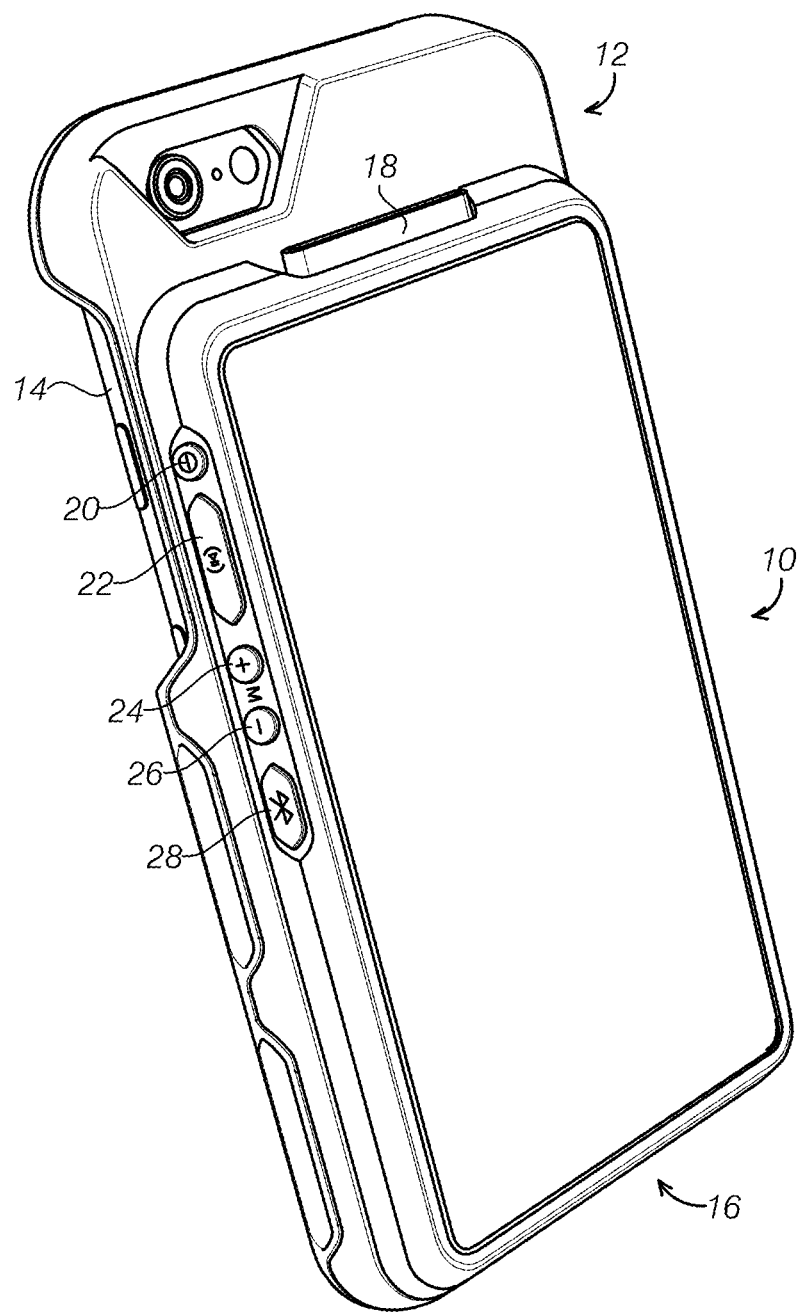
FIG. 1 illustrates a front perspective view of a speaker and conference call module attached to a mobile device case according to an exemplary embodiment of the present invention.

Unless otherwise indicated illustrations in the figures are not necessarily drawn to scale.

The invention and its various embodiments can now be better understood by turning to the following detailed description wherein illustrated embodiments are described. It is to be expressly understood that the illustrated embodiments are set forth as examples and not by way of limitations on the invention as ultimately defined in the claims.

DETAILED DESCRIPTION OF THE PREFERRED EMBODIMENTS AND BEST MODE OF INVENTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention, and is not intended to limit the invention to the specific embodiments illustrated by the figures or description below.

Devices or system modules that are in at least general communication with each other need not be in continuous communication with each other, unless expressly specified otherwise. In addition, devices or system modules that are in at least general communication with each other may communicate directly or indirectly through one or more intermediaries.

A description of an embodiment with several components in communication with each other does not imply that all such components are required. On the contrary, a variety of optional components are described to illustrate the wide variety of possible embodiments of the present invention.

As is well known to those skilled in the art, many careful considerations and compromises typically must be made when designing for the optimal configuration of a commercial implementation of any system, and in particular, the embodiments of the present invention. A commercial implementation in accordance with the spirit and teachings of the present invention may be configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

Broadly, embodiments of the present invention provide a speaker and conference call module and mobile device case combination, where a mobile device, such as a smartphone, can be retained by the mobile device case. The speaker and conference call module is configured to wirelessly connect to the mobile device to permit audio from the mobile device to be played on the speaker and conference call module. The speaker and conference call module further includes a microphone to permit audio pick-up by the module and deliver that audio signal to the mobile device, permitting two-way conference call features. The speaker and conference call module can produce sound via one or more exciter voice coils attached to the front surface thereof, where the front surface may be a material suitable for sound generation via an exciter, such as a carbon fiber material. The speaker and conference call module can be removed from and reattached to the mobile device case for convenient mounting.

Referring to FIG. 1, a combination mobile device case and speaker and conference call module 16 can include a mobile device case 12 and a speaker and conference call module 16, which is also simply referred to as speaker module 16 or conference call module 16. The mobile device case 12 can retain a mobile device 14 therein. The mobile device 14 can be retained in the mobile device case 12 via various methods, such as a friction fit, flexible protrusions, a snap-fit, a slide fit, or any other method contemplated by one of skill in the art.

The speaker and conference call module 16 can be removed from the mobile device case 12 via a button 18, where depression of the button 18 allows the speaker and conference call module 16 to be readily separated from the mobile device case 12, as described in greater detail below. Other retention methods may be utilized provided that a user may readily, without tools, remove the conference call module 16 from the mobile device case 12.

The speaker and conference call module 16 can include a plurality of control buttons. Exemplary control buttons include a power button 20, a play/pause button 22, a minus button 24, a plus button 26 and an equalizer button/pairing 28. The minus and plus buttons 24, 26 may perform various functions, such as control volume, control playback, control equalization, or the like. In some embodiments, one or more of the buttons 20-28 may be formed from a translucent material, where an indicator, such as a light emitting diode (LED) may be disposed therebehind, providing one or more indications to a user, such as wireless link status, battery power status, or the like. Other control buttons may be present on the speaker and conference call module 16 as may be needed for a particular application, such as a mute button, separate playback track selection buttons, or the like.

Figure 2:
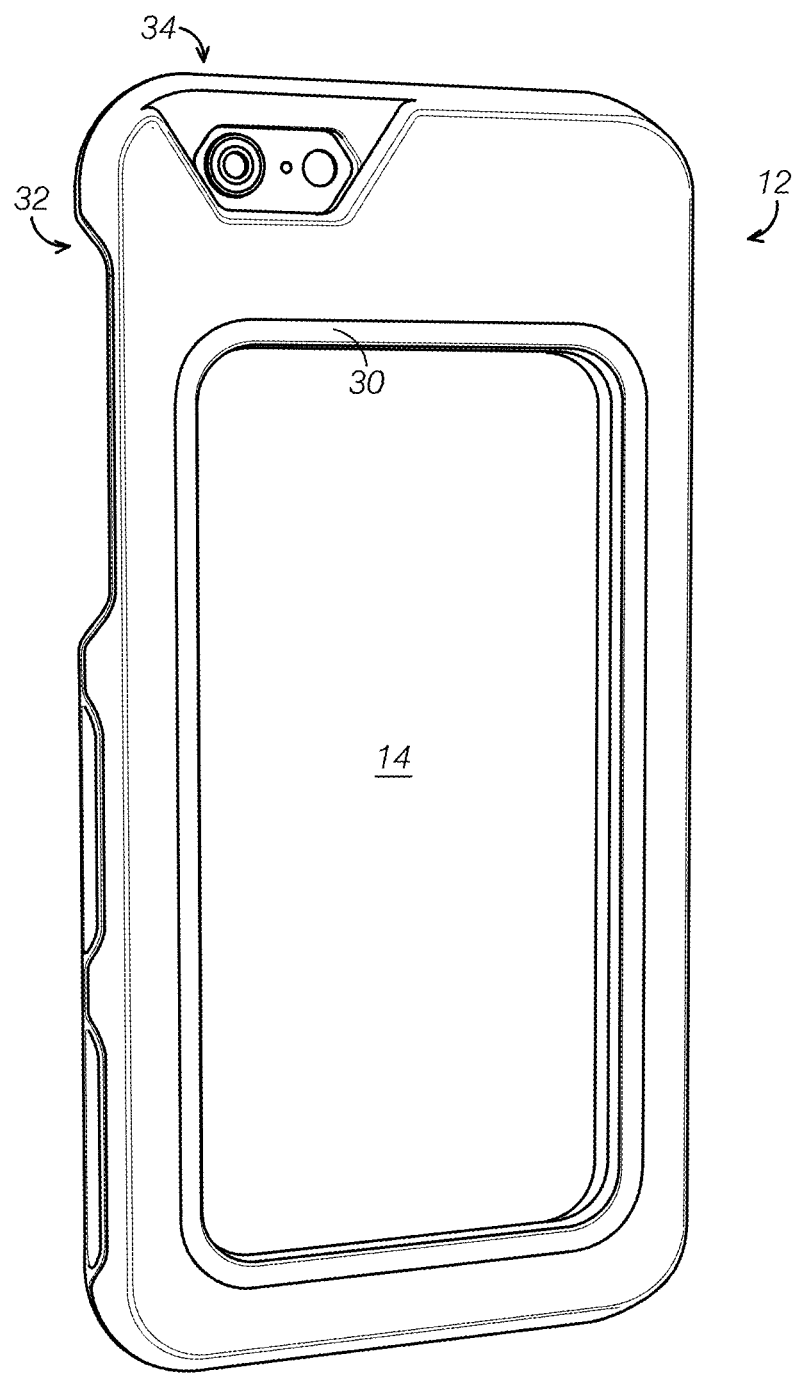
FIG. 2 illustrates a back side perspective view of the mobile device case of FIG. 1, with the speaker and conference call module removed therefrom and a mobile device disposed in and retained by the mobile device case.
Figure 3:
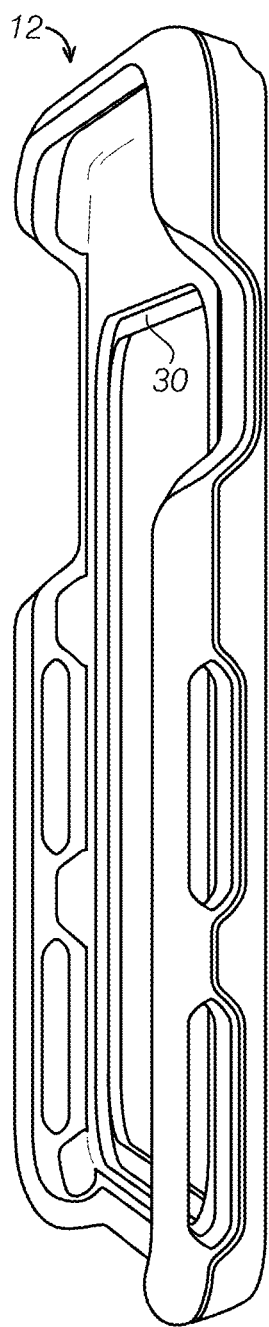
FIG. 3 illustrates a side perspective view of the mobile device case of FIG. 1, with both the mobile device and the speaker and conference call module removed therefrom.
Figure 4:
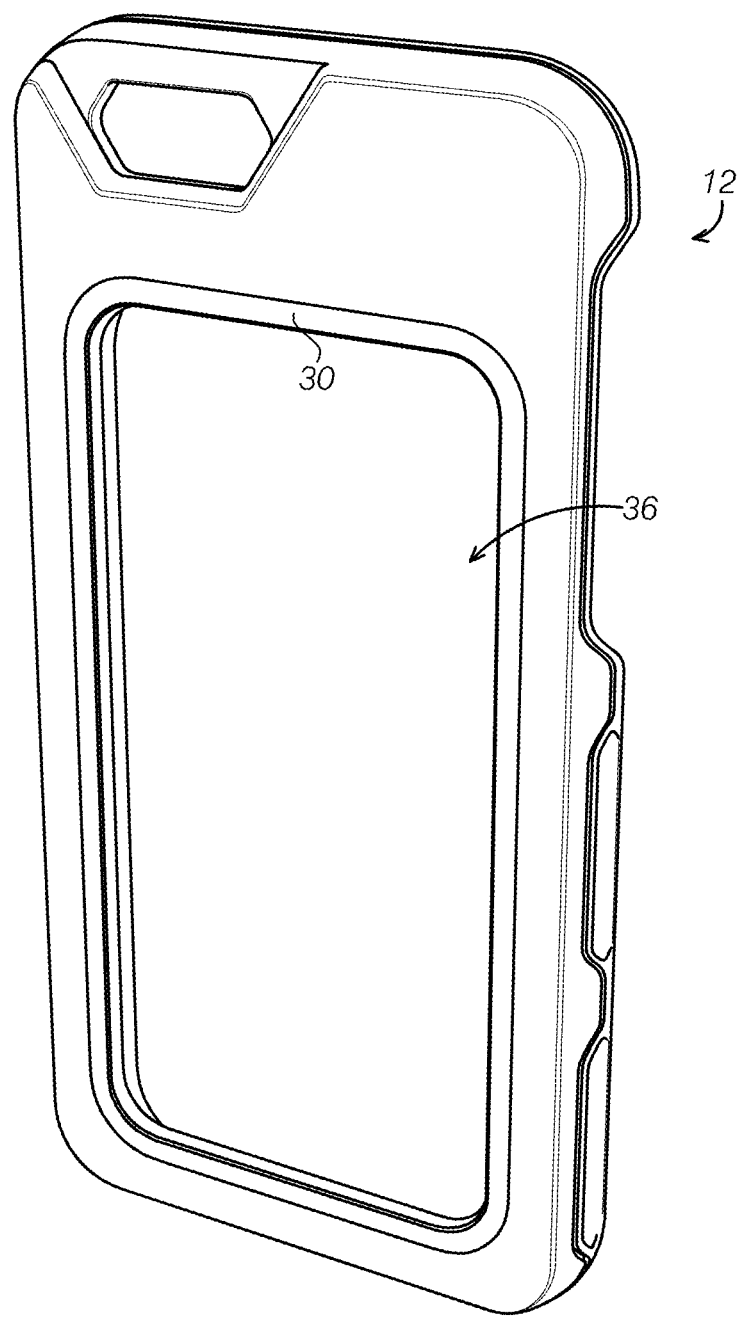
FIG. 4 illustrates a back perspective view of the mobile device case of FIG. 1, with both the mobile device and the speaker and conference call module removed therefrom.

Referring now to FIGS. 2 through 4, details of the mobile device case 12 are shown. The mobile device case 12 can include a back opening 36 having an opening periphery 30. Typically, the periphery 30 may be formed from a color different from a color of the mobile device case 12, signifying the location for mounting the speaker and conference call module 16. The mobile device case 12 can include one or more side indents 32 where a side portion of the mobile device case 12 is removed to permit access to the control buttons (not shown) of the mobile device 14. The mobile device case 12 can also include a camera and flash opening 34 to permit access to the camera and flash of the mobile device 14, as shown in FIG. 2. Typically, the mobile device case 12 has an open front face to permit access to the mobile device 14 when mounted therein.

Figure 5:
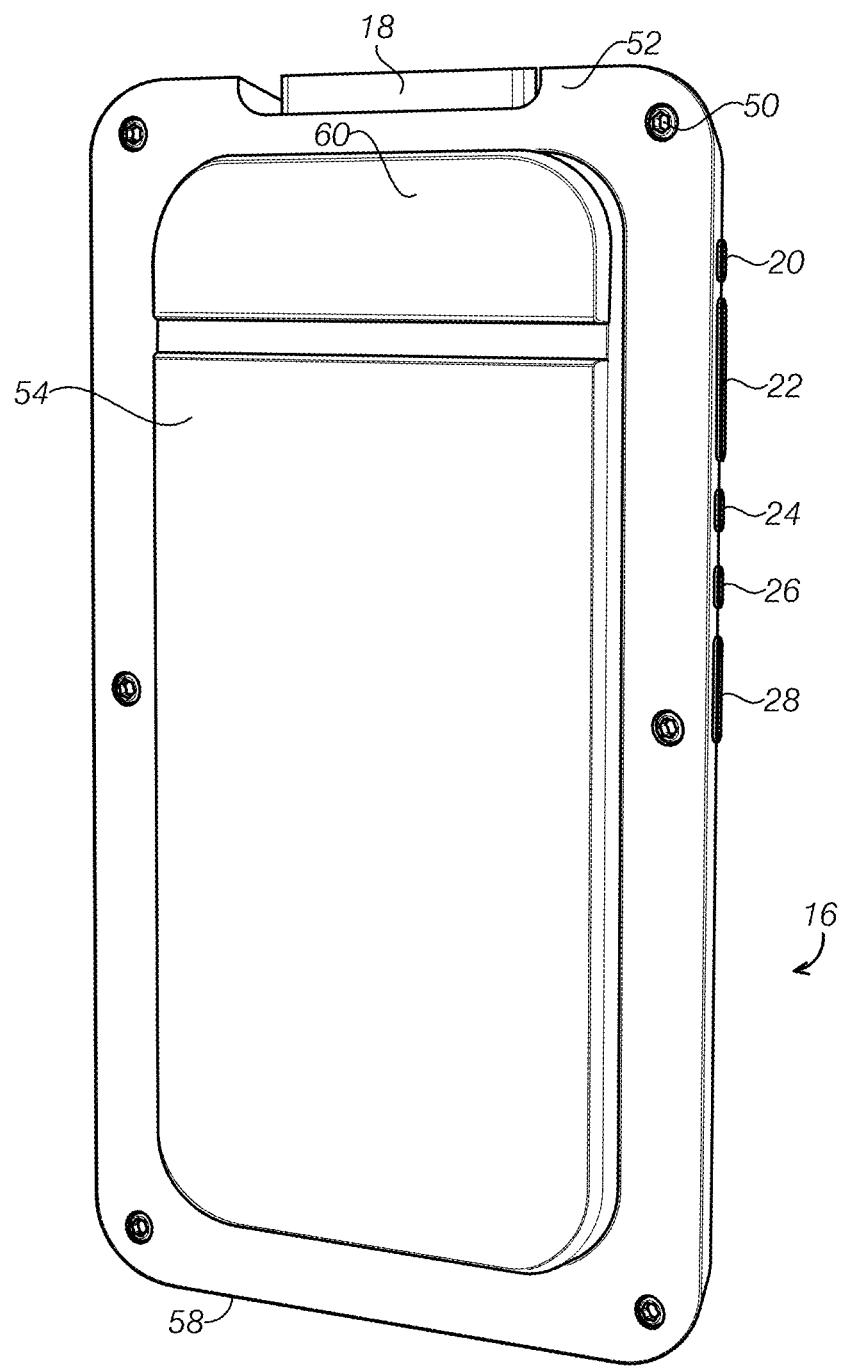
FIG. 5 illustrates back view of the speaker and conference call module of FIG. 1 removed from the mobile device case.
Figure 6:
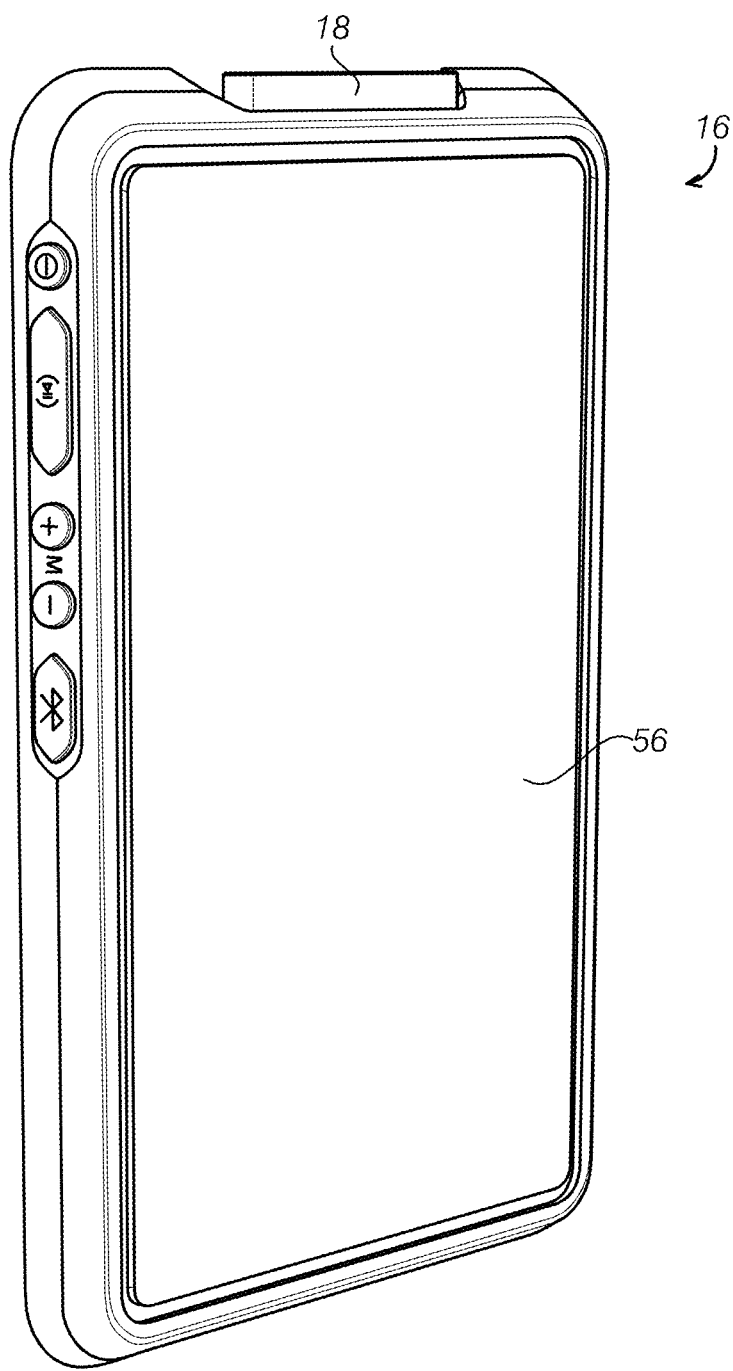
FIG. 6 illustrates a front perspective view of the speaker and conference call module of FIG. 1 removed from the mobile device case.

Referring to FIGS. 5 and 6, the speaker and conference call module 16 includes a protruding back housing 54 that extends about a main housing 52 of the speaker and conference call module 16. The amount the back housing 54 protrudes from the main housing 52 may be the same as or less than a depth of the back opening 36 when the mobile device 14 is placed in the mobile device case 12 (see FIGS. 2 and 4). Thus, the protruding back housing 54 can fit into the mobile device case 12 (as shown in FIG. 1) and the main housing 52 rests adjacent to the periphery 30 of the opening 36. Moreover, the protruding design of the back housing 54 assists in placement of the speaker and conference call module 16 into the mobile device case 12. Fasteners 50 may be used to hold the main housing 52 together. The fasteners 50 may be screws, as shown, or may be some other means for assembling the housing, as would be known in the art.

The button 18 may be resiliently depressed to move slide portion 60 of the back housing 54. The slide portion 60 may slide downward (in the direction of the force applied to the button 18) when the button is depressed to permit installation and removal of the speaker and conference call module 16 onto the mobile device case 12. The slide portion 60 may extend under the periphery 30 of the opening 36 to secure the speaker and conference call module 16 to the mobile device case 12. In some embodiments, a portion of the bottom of the back portion 54 may also fit under the periphery 30 of the opening 36 to better secure the conference call module 60 to the mobile device case 12. A resiliency member, such as a leaf spring 70 (see FIG. 7) may be disposed to keep the button 18 in an undepressed state and the slide portion 60 in its extended configuration, as shown in FIG. 5.

While the slide portion 60 is configured to retain the speaker and conference call module 16 in the mobile device case 12, various other mounts may be used to retain the speaker and conference call module 16. For example, the speaker and conference call module 16 may attach to a handlebar mount, a strap mount/jacket mount, a magnetic mount, a suction cup mount, or the like. Therefore, the speaker and conference call module 16 may be removed from the mobile device case 12 and may be mounted at various locations, depending on application.

A front face 56 of the speaker and conference call module 16 can have exciters (described below) attached thereto to generate sound from the entirety of the front face 56. The front face may be formed from a woven carbon fiber, for example. The carbon fiber used in the front face 56 may be, for example, from about 0.5 to about 0.75 mm thick, typically about 0.67 mm thick. A microphone 58 may be disposed along an edge of the speaker and conference call module 16. While FIG. 5 shows the microphone 58 in a particular location, one or more microphones may be disposed at any location on the speaker and conference call module 16.

The speaker and conference call module 16 may be designed to be water resistant. In some embodiments, the speaker and conference call module 16 may have an IPX7 rating, for example. Thus, the microphone 58 may be a water resistant microphone. Similarly, the control buttons (elements 20 through 28) may be made with a water resistant cover, such as rubber, for example.

Figure 7:
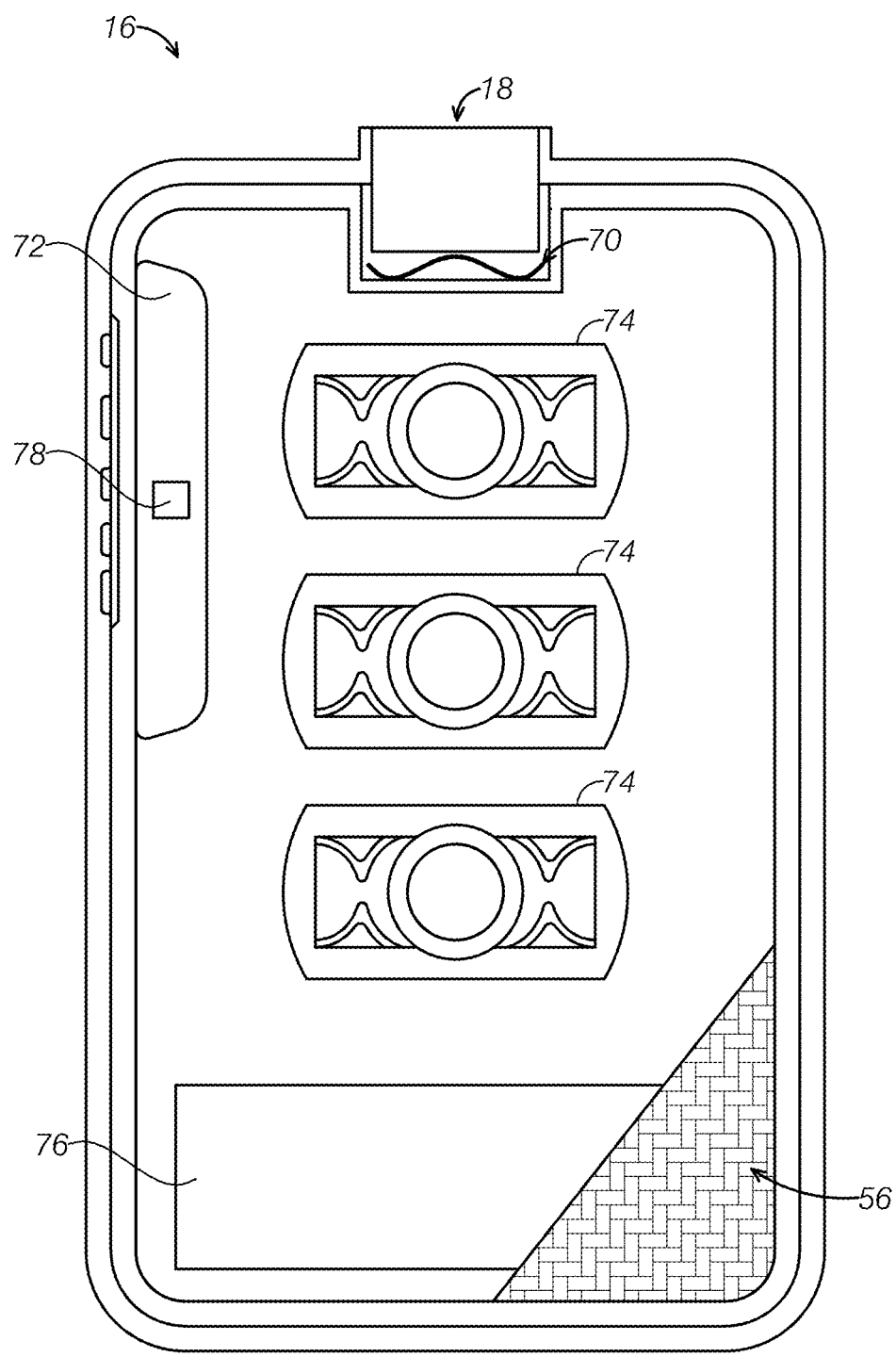
FIG. 7 illustrates a partially cut-away front view of the speaker and conference call module of FIG. 1 removed from the mobile device case, showing select internal components of the speaker and conference call module, according to an exemplary embodiment of the present invention.

Referring now to FIG. 7, a portion of the front face 56 is removed to show various internal components of the speaker and conference call module 16. While a specific configuration is shown in FIG. 7, the components, as well as additional or fewer components, may be arranged in different arrangements.

A circuit board 72 may be disposed within the speaker and conference call module 16 to receive input from the control buttons, receive an audio signal from a wireless transceiver 78, process the audio signal, and generate an output audio signal to one or more voice coil exciters 74. The circuit board 72 may contain components known in the art for an audio receiving and processing device, such as amplifiers, and the like. For example, a 2.5 W (minimum) by 2 channel amplifier may be used in the present invention. The amplifier/audio path may include equalization components. For example, depressing the equalizer button 28 may change audio output modes. Various modes may be configured into the circuit board 72, such as an indoor setting, having a flat frequency response with as low of bass response as possible, or an outdoor setting, with priority to sound output level (SPL). The state of equalization (for example, whether in the indoor or outdoor mode) may be announced by the device, or another type of indicator may be used, such as a multi-color LED, for example. The circuit board 72 may include audio digital signal processing (DSP) with bass enhancing algorithms, for example.

The exciters 74 may be chosen depending on the size of the mobile device case 12, for example. In some embodiments, the exciters 74 may be a 5 W-rated, 13 mm voice coil dynamic driver mounted directly to an internal surface of the carbon fiber front face 56.

The wireless transceiver 78 may be capable of receiving an audio signal from the mobile device 14 and also sending an audio signal from the microphone 58 to the mobile device 14. In some embodiments, the wireless transceiver 78 may be a Bluetooth® 4.0+enhanced data rate (EDR) receiver that may support, for example, advanced audio distribution profile (A2DP), audio-video remote control profile (AVRCP), hands free profile (HFP), headset profile (HSP), however, other wireless communication protocols may be utilized in the conference call module 16 of the present invention.

A battery 76 may provide power to the speaker and conference call module 16. The battery 76 may be a rechargeable battery, such as a polymer lithium-ion battery, for example. The battery 76 may be inductively charged, such as via wireless Qi charging, or may be charged via a power port (not shown). When a power port is present, a port plug may be provided to maintain water resistant properties of the speaker and conference call module 16 when charging is not occurring.

Typically, the speaker and conference call module 16 is designed with a width matching the width of the mobile device case 12. The thickness of the speaker and conference call module 16 may be, for example, from about 10 to about 20 mm, typically about 11 mm Such a thickness allows mounting on the mobile device case 12 without substantially increasing the overall size of the mobile device 14.

While a smartphone is shown on the mobile device 14, the combination case and conference call module 10 can be designed for various mobile devices, including convertible electronic devices, tablet computing devices regardless of make or operating system, and other such portable electronic devices.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

Claim elements and steps herein may have been numbered and/or lettered solely as an aid in readability and understanding. Any such numbering and lettering in itself is not intended to and should not be taken to indicate the ordering of elements and/or steps in the claims.

Many alterations and modifications may be made by those having ordinary skill in the art without departing from the spirit and scope of the invention. Therefore, it must be understood that the illustrated embodiments have been set forth only for the purposes of examples and that they should not be taken as limiting the invention as defined by the following claims. For example, notwithstanding the fact that the elements of a claim are set forth below in a certain combination, it must be expressly understood that the invention includes other combinations of fewer, more or different ones of the disclosed elements.

The words used in this specification to describe the invention and its various embodiments are to be understood not only in the sense of their commonly defined meanings, but to include by special definition in this specification the generic structure, material or acts of which they represent a single species.

The definitions of the words or elements of the following claims are, therefore, defined in this specification to not only include the combination of elements which are literally set forth. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what incorporates the essential idea of the invention.

What is claimed is:

1. A device accessory system for a mobile device, the device accessory system comprising:
   a case configured to at least partially retain a mobile device, the case comprising an opening;
   an accessory comprising a main housing, the accessory configured to removably couple to the case, the accessory comprising:
      a back housing protruding from the main housing, the back housing configured to be received within the opening of the case, the back housing including a bottom portion configured to be engaged with a bottom periphery of the opening of the case; and
      a slide portion configured to be engaged with a top periphery of the opening of the case, the slide portion configured to slide downward to permit attachment of the accessory to the case and removal of the accessory from the case.

2. The device accessory system of claim 1, wherein the slide portion is configured to slide on the back housing and extend beyond at least one side edge of the back housing.

3. The device accessory system of claim 2, further comprising a button on the main housing, the button being mechanically connected to the slide portion, the button being resiliently depressible to move the slide portion to a compressed configuration, wherein the slide portion extends beyond the at least one side edge less than when the button is not depressed.

4. The device accessory system of claim 1, wherein the slide portion is configured to extend under the top periphery to secure the accessory to the case.

5. The device accessory system of claim 1, wherein the back housing of the accessory is configured to be slid into the opening of the case.

6. The device accessory system of claim 1, wherein the back housing is configured to fit into the opening of the case and the main housing is configured to rest adjacent the top and bottom peripheries.

7. The device accessory system of claim 1, wherein the main housing is configured to rest against a surface of the case.

8. The device accessory system claim 1, wherein the back housing of the accessory comprises a side extending between the slide portion and the bottom portion, the side comprising a substantially flat surface configured to slide fit into the opening of the case against a corresponding surface of the opening of the case.

9. The device accessory system of claim 1, wherein the accessory comprises a battery.

10. The device accessory system of claim 1, wherein the accessory comprises a speaker and conference call module.

11. A mobile device accessory for a mobile device case, the mobile device accessory comprising:
a main housing;
a back housing protruding from the main housing, the back housing configured to be received in an opening of a mobile device case, the back housing comprising:
a first portion extending from the back housing such that the first portion is configured to engage a first periphery of the opening of the mobile device case; and
a second portion configured to be moved to engage and disengage a second periphery of the opening of the mobile device case, the second portion biased to extend past a perimeter of the back housing to engage the second periphery of the opening of the mobile device case.

12. The mobile device accessory of claim 11, wherein the second portion is configured to be slidably received within the opening relative to the second periphery.

13. The mobile device accessory claim 12, wherein the second portion extends parallel to a surface of the main housing.

14. The mobile device accessory of claim 11, wherein the second portion is configured to slide under the second periphery of the mobile device case to secure mobile accessory to the mobile device case.

15. The mobile device accessory of claim 11, wherein the first portion extends parallel to a surface of the main housing.

16. The mobile device accessory of claim 11, wherein the first portion is configured to slide under the first periphery of the mobile device case to secure mobile accessory to the mobile device case.

17. A mobile device accessory for a mobile device case, the mobile device accessory comprising:
a housing configured to be at least partially received within a mobile device case for a mobile device, the housing including a bottom portion configured to be engaged with a bottom periphery of the mobile device case; and
a slide portion configured to be engaged with a top periphery of the mobile device case, the slide portion configured to slide downward to permit attachment of the mobile device accessory to the mobile device case and removal of the mobile device accessory from the mobile device case.

18. The mobile device accessory of claim 17, further comprising an opening in the mobile device case, and wherein the top and bottom peripheries extend from sides of the opening, the opening configured to accept at least partly the bottom and slide portions.

19. The mobile device accessory claim 18, further comprising a side extending between the bottom and slide portions, the side comprising a substantially flat surface configured to slide fit with a corresponding surface of the opening of the mobile device case.

20. The mobile device accessory of claim 17, wherein the bottom portion is opposite the slide portion relative to the housing.

* * * * *

UNITED STATES PATENT AND TRADEMARK OFFICE
CERTIFICATE OF CORRECTION

PATENT NO. : 10,804,949 B2
APPLICATION NO. : 16/277702
DATED : October 13, 2020
INVENTOR(S) : Shane Wilder et al.

It is certified that error appears in the above-identified patent and that said Letters Patent is hereby corrected as shown below:

In the Specification

In Column 7, Line 24, delete "11 mm" and insert --11 mm.--.

In the Claims

In Column 8, Line 62, Claim 8, delete "system claim" and insert --system of claim--.

In Column 9, Line 23 (approx.), Claim 13, delete "accessory claim" and insert --accessory of claim--.

In Column 10, Line 24, Claim 19, delete "accessory claim" and insert --accessory of claim--.

Signed and Sealed this
Fifteenth Day of December, 2020

Andrei Iancu
*Director of the United States Patent and Trademark Office*